United States Patent [19]

Sullivan et al.

[11] Patent Number: 4,541,694
[45] Date of Patent: Sep. 17, 1985

[54] ACOUSTO-OPTIC SCANNERS

[75] Inventors: Sean Sullivan, East Grinstead; Roger A. Edwards, Crawley, both of England

[73] Assignee: Rediffusion Simulation Limited, Crawley, England

[21] Appl. No.: 478,713

[22] Filed: Mar. 25, 1983

[30] Foreign Application Priority Data

Mar. 27, 1982 [GB] United Kingdom ............... 8209056

[51] Int. Cl.$^4$ ............................................. G02F 1/33
[52] U.S. Cl. ..................................... 350/371; 350/405
[58] Field of Search ............... 350/371, 358, 401, 405

[56] References Cited

U.S. PATENT DOCUMENTS 3,713,721  1/1973  Watson .............................. 350/371
4,150,880  4/1979  Howe et al. ........................ 350/358

FOREIGN PATENT DOCUMENTS 2507332  12/1982  France ............................. 350/358
1180879   2/1970  United Kingdom .

OTHER PUBLICATIONS

Merry, V. B., "Multiple Wavelength Acousto-Optic Deflection" Research Disclosure 16033, 8-1977, pp. 12-13.

Masuda et al., "Monochromatic Light Source with Electronically Variable Wavelength", Trans. of IECE of Japan, 5-1980, pp. 329-336.

Grodnenskii et al., "Two-Coordinate Acoustooptical Light Deflector" Instruments & Experimental Techniques, vol. 18, 1/2/1975, pp. 233-234.

Watson et al., "Equalization of Acoustooptic Deflection Cells in a Laser Color TV System", App. Optics 5-1970, pp. 1176-1179.

Primary Examiner—William H. Punter
Attorney, Agent, or Firm—Laurence R. Brown

[57] ABSTRACT

An acousto-optic scanner comprising at least two optical sources the outputs of which differ in frequency, a common acousto-optic deflector, a scan lens, and scan correction means. The output of the light sources are directed through the common acoustic-optic deflector and the outputs of the common acoustic-optic deflector are directed through the scan correction means which comprises a plurality of optical elements. The effect of the optical elements on optical beams is dependent upon beam characteristics.

9 Claims, 4 Drawing Figures

ACOUSTO-OPTIC SCANNERS

The present invention relates to improvements in acousto-optic scanners.

Essentially an acousto-optic scanner comprises a deflector which deflects an optical beam onto a scan lens. The deflector operates by deflecting the beam by means of an ultra-sonic sound wave applied to it by means of an R.R. signal transducer. The sound wave produces a periodic variation in the refractive index of the material of the deflector by means of the piezo-optic effect. Variation of the refractive index produces a phase grating which diffracts the beam.

As a result of the above described effect when an optical beam is incident on the deflector a first order diffracted beam is output from the deflector when a sound wave is applied thereto. Only a zero order non-diffracted beam is output from the deflector when no soundwave is applied thereto. The first order diffracted beam is directed to the scan lens.

The angle of diffraction $\theta$ of the acoustically generated grating is given approximately by the equation:

$$\theta = \frac{\lambda}{\Omega} = \frac{\lambda f}{v} \qquad 1$$

where $\lambda$ is the optical wavelength measured in air of the incident beam, f is the ultrasonic frequency of the sound wave and $v$ is the ultrasonic velocity of the sound wave.

It will be appreciated from equation (1) that varying the ultrasonic frequency f changes the diffraction angle $\theta$ of the grating. As a result the total angular swing $\Delta\theta$ of the output beam is proportional to the change in ultrasonic frequency $\Delta f$ as shown in equation (2)

$$\Delta = \frac{\lambda \Delta f}{v} \qquad 2$$

Acousto-optic deflectors provide low cost, compact, reliable devices capable of high resolution. They suffer, however, from the major disadvantage of being wavelength dependant (see equation (2)). As a result their use has been limited to essentially single wavelength laser sources.

Consider what happens in the focal plane of the scan lens positioned at the output of the deflector when two optical beams of different wavelength are incident on the deflector. The scan length of each wavelength will be different and the centre of each scan will be displaced one with respect to the other. It is possible using a simple prism to arrange the centre of both scans to be coincident. Unfortunately however this arrangement does not compensate for differences in the scan length.

Clearly in many applications, for example, full colour laser displays, beams of more than one wavelength are required. It has been proposed to use separate acousto-optic deflectors for the various wavelengths, and to arrange for the total deflection angle of all the wavelengths to be the same using pairs of prisms to change the magnification of the separately deflected beams. It is however undesirable to use separate acousto-optic deflectors for the various wavelengths present for reasons of cost, complexity and reliability.

It is an object of the present invention to obviate or mitigate the above problems of the prior art.

According to the present invention as shown in FIG. 4 there is provided an acousto-optic scanner comprising at least two optical sources 21, 22 the outputs of which differ in frequency (corresponding to wavelengths $\lambda_1$, $\lambda_2$), a common acousto-optic deflector 23, a scan lens 24, and scan correction means 25, the output of the light sources being directed through the common acousto-optic deflector and the outputs of the common acousto-optic deflector being directed through the scan correction means which comprises a plurality of optical elements the effect of which on optical beams is dependent upon beam characteristics.

Preferably the scan correction means 25 is positioned between the scan lens 24 and the scan image 26 and the acousto-optic deflector 23 is positioned between the said optical sources 21, 22 and the scan lens 24 at the front focus 27 of the scan lens. The scan is thus telecentric (i.e. all the principal rays will be substantially parallel).

The scan corrections means may be pairs of normal dispersion prisms or alternatively birefringent prisms. To provide scan correction in one dimension, a single pair of prisms is used. To provide scan correction in two dimensions, two orthogonal pairs of prisms arranged in series are used.

Where birefringent prisms are used the light beams incident thereon are arranged to have orthogonal polarisations. This can be achieved using half wave plates.

Alternatively, the scan correction means may comprise a plurality of volume holograms, a volume hologram being provided in respect of each optical beam incident on the deflector.

Embodiments of the present invention will now be described, by way of example, with reference to the accompanying drawings in which.

Figure 1:
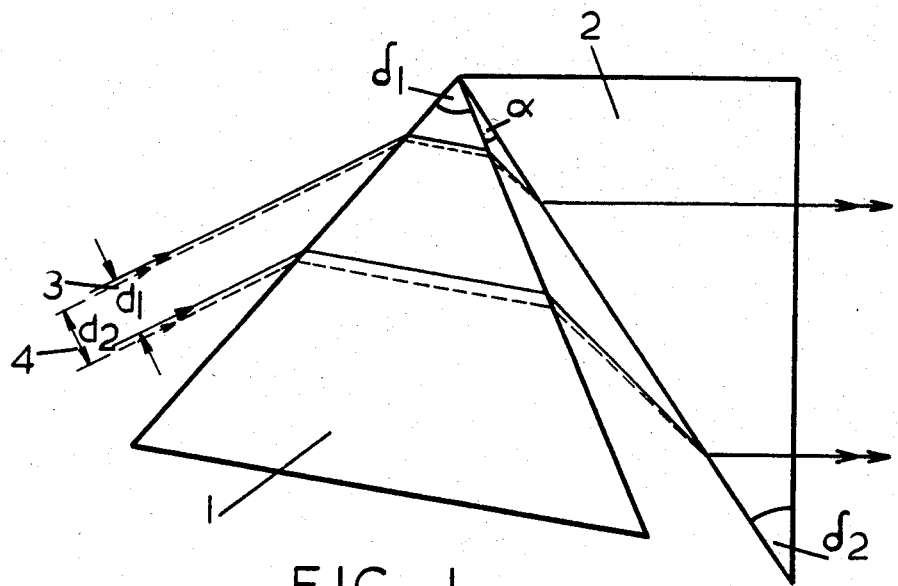
FIG. 1 shows schematically an embodiment of the present invention in which scan correction is achieved using the dispersion of refractive prisms.

Referring firstly to FIG. 1 there are shown two glass prisms 1 and 2. Two light beams 3 and 4 of different wavelength $\lambda_1$, and $\lambda_2$, respectively and scan length $d_1$ and $d_2$, respectively, are incident upon a face of prism 1. The light beams 3 and 4 are output from an acousto-optic deflector, not shown, for simplicity of explanation. The characteristics of the acousto-optic deflector result in:

$$d_1/d_2 = \lambda_1/\lambda_2$$

The scan correction apparatus of FIG. 1 superimposes the two scans.

The dispersion of the prisms 1 and 2 is chosen to provide exact scan correction for the two light beams 3 and 4.

An example of scan correction values for the apparatus of FIG. 1 is given herebelow:
$\lambda_1 = 488$ nm, $\lambda_2 = 514.5$ nm
Glass for both prisms is SF8
The refractive index of the glass is: $n488 = 1.70594$, $n514.5 = 1.69913$ $\delta_1 = 66.14°$, $d = 10.61°$, $\delta_2 = 35.15°$ The system of FIG. 1 provides exact scan correction for two wavelengths, but there will be some scan correction at other wavelengths. It is possible that there will be exact scan correction at three wavelengths if the refractive prisms are of different dispersions.

It will be appreciated that for two dimensional scanning two orthogonal systems may be used in series for scan correction.

Figure 2:
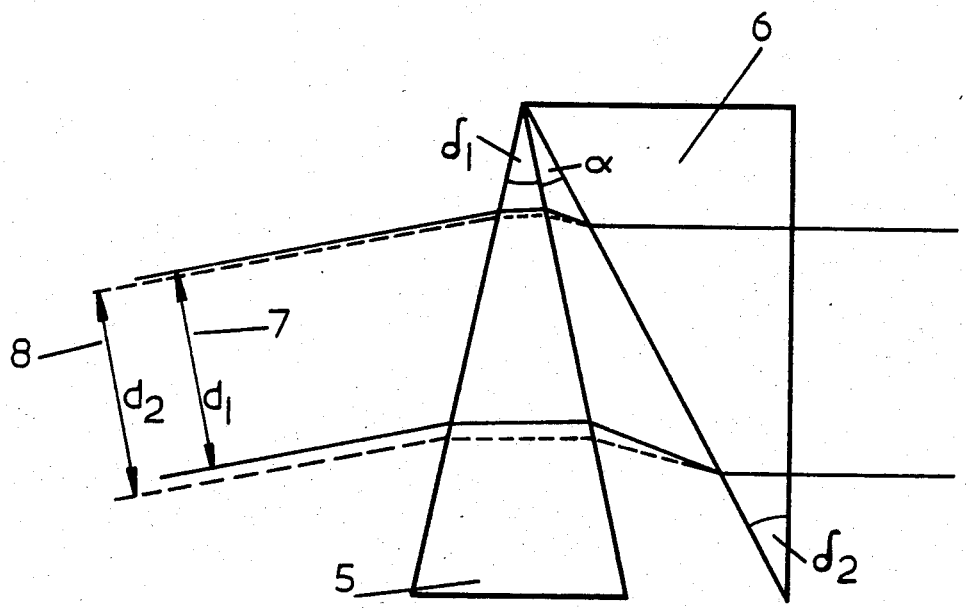
FIG. 2 shows schematically an embodiment of the present invention in which scan correction is achieved using birefringent prisms.

Referring now to FIG. 2 there are shown two birefringent prisms 5 and 6. Two light beams 7 and 8 of different wavelength $\lambda_1$ and $\lambda_2$, respectively, and scan length $d_1$ and $d_2$ respectively are incident upon a face of prism 5. As in FIG. 1 the light beams 7 and 8 are output from an acousto-optic scanner, not shown for simplicity of explanation.

As previously stated the material for both prisms is birefringent. An example of a material with natural birefringence is calcite. In FIG. 2 the crystal axis of the prisms is perpendicular to the page. The incident beams are arranged to have orthogonal polarisations, one wavelength being in the plane of the page and the other perpendicular to the page. (This can be achieved using half-wave plates).

Sample values for the apparatus of FIG. 2 are given herebelow. The material of the prisms is calcite.
Calcite, $n_o = 1.658$ $ne = 1.486$
$\lambda_1 = 488$ nm, polarisation in plane of page, path through prisms determined by $n_o$
$\lambda_2 = 514.5$ nm, polarisation perpendicular to page, path through prisms determined by ne.

$$\delta_1 = 29.14°, \alpha = 16.30°, \delta_2 = 24.62$$

The apparatus of FIG. 2 has the advantage of being less sensitive to prism manufacturing tolerances and prism movements than the apparatus of FIG. 1. However, scan compensation only occurs for a pair of wavelengths.

Prisms are relatively easy to make when compared with for example lenses, and in addition do not suffer from aberration. A further advantage of using prisms is that they use relatively little expensive material. Thus prism systems are relatively cheap, easy to make and suffer from little light loss.

Figure 3:
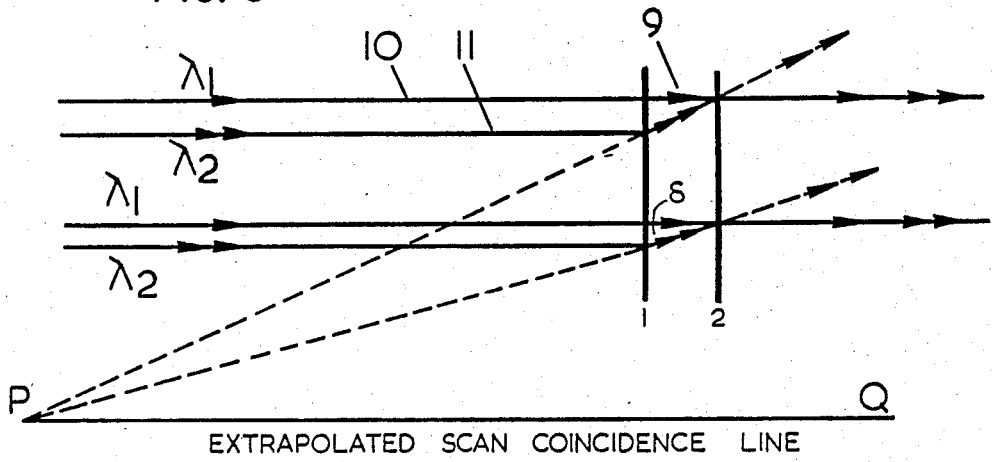
FIG. 3 shows schematically an embodiment of the present invention using holographic optical elements.
Figure 4:
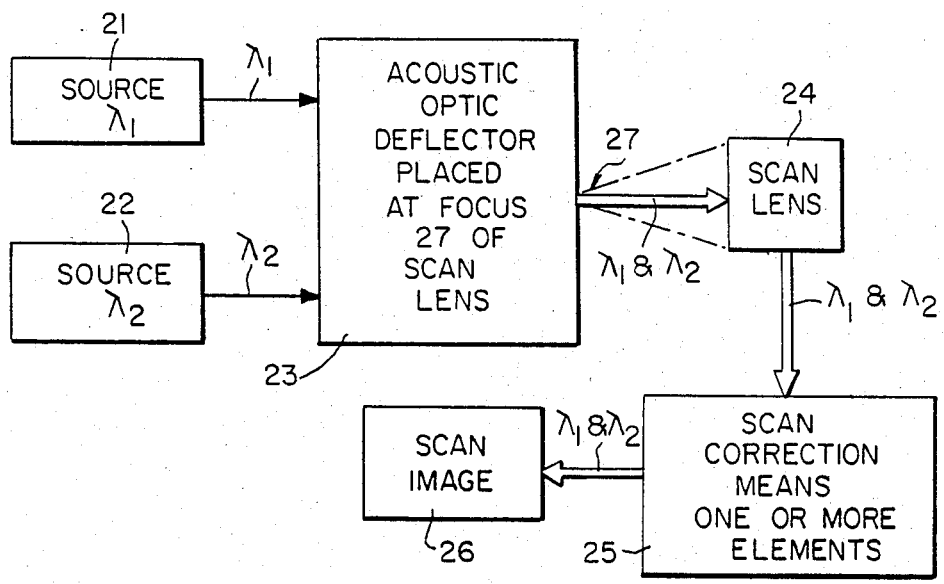
FIG. 4 is a block diagram of the system organization.

Referring now to FIG. 3 there is shown a schematic diagram of scan correction apparatus using a volume hologram 9. Incident upon the volume hologram 9 are two light beams 10 and 11 of wavelength $\lambda_1$, and $\lambda_2$ respectively. Plane 1 of the volume hologram 9 has no effect upon wavelength $\lambda_1$, but for $\lambda_2$ acts as a negative lens with a focus at P, which lies on the extrapolated scan coincidence line Q.

As a result of the deflection of $\lambda_2$ in plane 1 of the volume hologram $\lambda_2$ is coincident with $\lambda_1$ in plane 2. Since the scales of the initial scans at $\lambda_1$ and $\lambda_2$ are linearly related and by considering similar triangles, it can be shown that the superposition of $\lambda_1$ and $\lambda_2$ will be exact in plane 2 throughout the entire scan.

It will be appreciated that element 1 is located so that the scan for $\lambda_1$ is in focus in plane 2 and that with a suitable choice of location for the point of focus P of $\lambda_2$, $\lambda_2$ will also be adequately focused in plane 2.

It will be appreciated however that there will be an angular difference $\delta$, now shown, between the rays at wavelengths $\lambda_1$, $\lambda_2$. This angle will vary across the scan.

Any subsequent optical system may be able to accept this angle. However, failing this, a second holographic element may be used in plane 2. Again, this will be a volume hologram producing no effect at wavelength $\lambda_1$; however, at $\lambda_2$ it will behave as a positive lens with its focus at P.

Although only a one-dimensional scan is shown, the system will work with a two-dimensional scan, the system being symmetrical about axis PQ.

The apparatus of FIG. 3 relies upon using a number of holographic elements to provide scan correction. It is essentially a beam expansion telescope whose magnification is a function of wavelength. It will generally only provide correction for discrete wavelengths and therefore as a rule the number of holographic optical elements will equal the number of wavelengths to be compensated.

It will be appreciated that in all of the embodiments of the present invention described the scan correction apparatus will be positioned between the scanning lens of the acousto-optic deflector and the scan image.

By placing the acousto-optic deflector at the front focus of the scanning lens, the scan will be telecentric, i.e. all the principal input rays will be in parallel. This condition is assumed to be met in all the embodiments of the invention.

Finally it will be appreciated that in the embodiment of FIG. 2 two dimensional scanning may be achieved by using two orthogonal systems in series, provided that a half-wave plate is used to rotate the planes of polarisation through 90°.

What is claimed is:

1. An acousto-optic scanner comprising at least two optical sources providing two light beam outputs which differ in frequency, a common acousto-optic deflector, a scan lens, and scan correction means comprising a plurality of optical elements, the two outputs of the light sources being directed through the common acousto-optic deflector and the outputs of the common acousto-optic deflector being directed through the scan lens and the scan correction means to form a scan image, the scan correction means being positioned between the scan lens and the scan image, and the acousto-optic deflector being positioned between the said optical sources and the scan lens at the front focus of the scan lens.

2. An acousto-optic scanner according to claim 1, wherein the scan correction means comprise a plurality of prisms.

3. An acousto-optic scanner according to claim 2, wherein a single pair of prisms is provided to provide scan correction in one dimension.

4. An acousto-optic scanner according to claim 2, wherein the prisms are normal dispersion prisms.

5. An acousto-optic system according to claim 1, wherein the scan correction means comprise a plurality of volume holograms.

6. An acousto-optic system according to claim 5, wherein two volume holograms are provided to correct the scan of the two respective light beams deflected by the deflector to produce coincidence of the beams.

7. An acoustic-optic scanner according to claim 1 wherein the scan correction means processes the two light beams therethrough in a superimposed path through the scan correction means.

8. An acoustic-optic scanner according to claim 7 wherein a first plane of said holograms encountered by the light beams acts as a negative lens to focus one of said light beams to appear in scan coincidence with the other said light beam at a second of said holograms encountered by the light beams.

9. An acoustic-optic scanner according to claim 2 wherein the scan correction prism means constitutes two adjacent prisms separated by a gap presenting an acute angle therebetween.

* * * * *